Dec. 10, 1957     W. C. EWALDSON ET AL     2,815,867
APPARATUS FOR SUPPORTING AND MOVING ELONGATE ARTICLES
Filed Feb. 15, 1955     2 Sheets-Sheet 1

INVENTORS
W. C. EWALDSON
H. W. GARBE
BY W.C. Parnell
ATTORNEY

Dec. 10, 1957 W. C. EWALDSON ET AL 2,815,867
APPARATUS FOR SUPPORTING AND MOVING ELONGATE ARTICLES
Filed Feb. 15, 1955 2 Sheets-Sheet 2
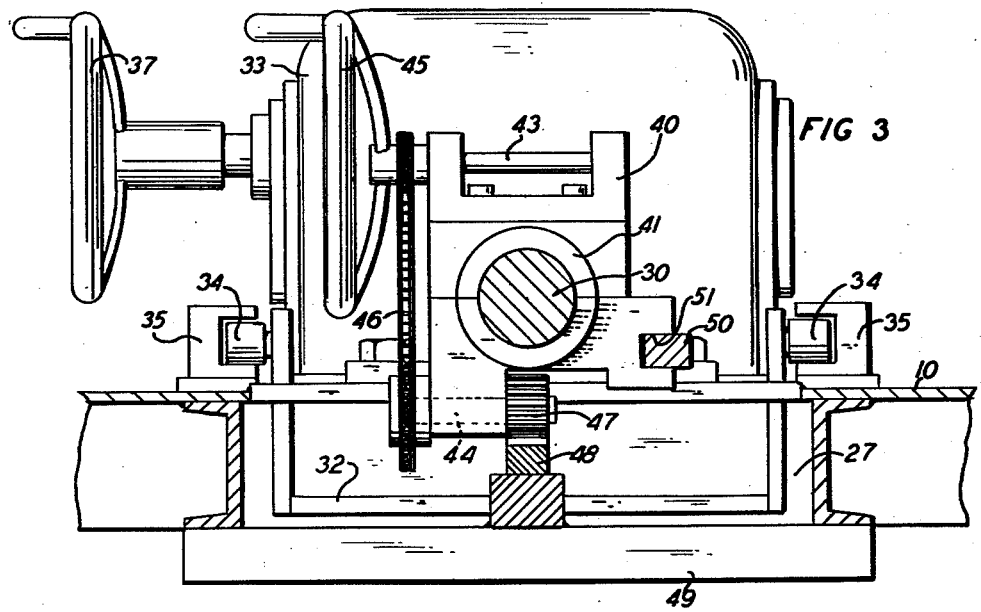
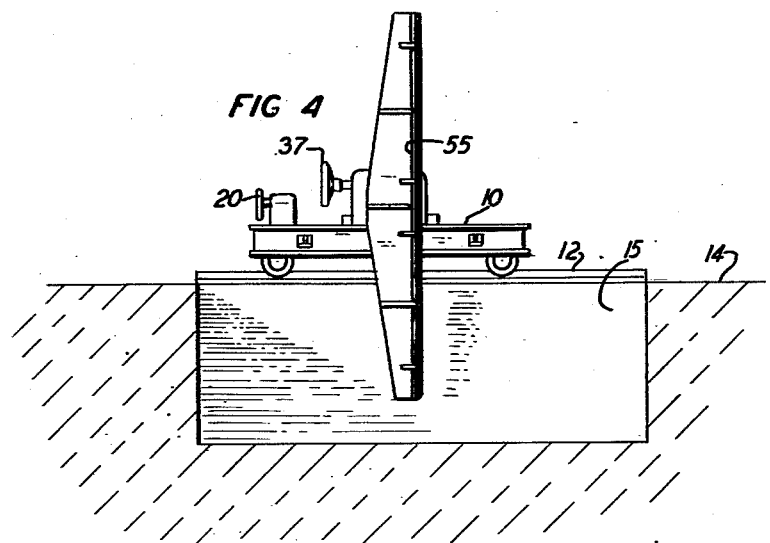
INVENTORS
W. C. EWALDSON
H. W. GARBE
BY
ATTORNEY

United States Patent Office 2,815,867
Patented Dec. 10, 1957

2,815,867

APPARATUS FOR SUPPORTING AND MOVING ELONGATE ARTICLES

Waldemar C. Ewaldson, Millington, and Howard W. Garbe, Madison, N. J., assignors to Western Electric Company, Incorporated, New York, N. Y., a corporation of New York Application February 15, 1955, Serial No. 488,274

4 Claims. (Cl. 214—1)

This invention relates to apparatus for supporting and moving elongate articles particularly submarine cable repeaters.

In the manufacture of certain long and somewhat heavy articles, such as submarine cable repeaters, it is necessary to move the articles into different positions relative to material working units so that work may be performed readily thereon. Due to the weight and size of such articles, special facilities are required to position and support such articles so that the various assembling and forming steps may be carried out.

The object of the present invention is an apparatus, although simple in structure, which is highly efficient in supporting and moving elongate articles.

With this and other objects in view, the invention comprises an apparatus for supporting and moving elongate articles, wherein a shelf to support the articles singly is mounted upon one end of a shaft supported by a carriage and movable therewith in a given path and also about the axis of the shaft.

More specifically, the carriage is supported by rollers mounted on parallel tracks disposed adjacent a pit in a floor which supports the tracks together with racks as parts of means to drive the carriage in the given path. The carriage supports the rocking means for the shaft and the means actuable to move the shaft axially whereby the combination of these moving means will permit varied movements to be imparted to the shelf supporting the article, rocking it into and out of the pit and moving it longitudinally and laterally of the pit relative to material working units.

Other objects and advantages will be apparent from the following detailed description when considered in conjunction with the accompanying drawings wherein:

Fig. 3 is an enlarged vertical sectional view taken along the line 3—3 of Fig. 1, and Fig. 4 is an end elevational view of the apparatus.

Figure 1:
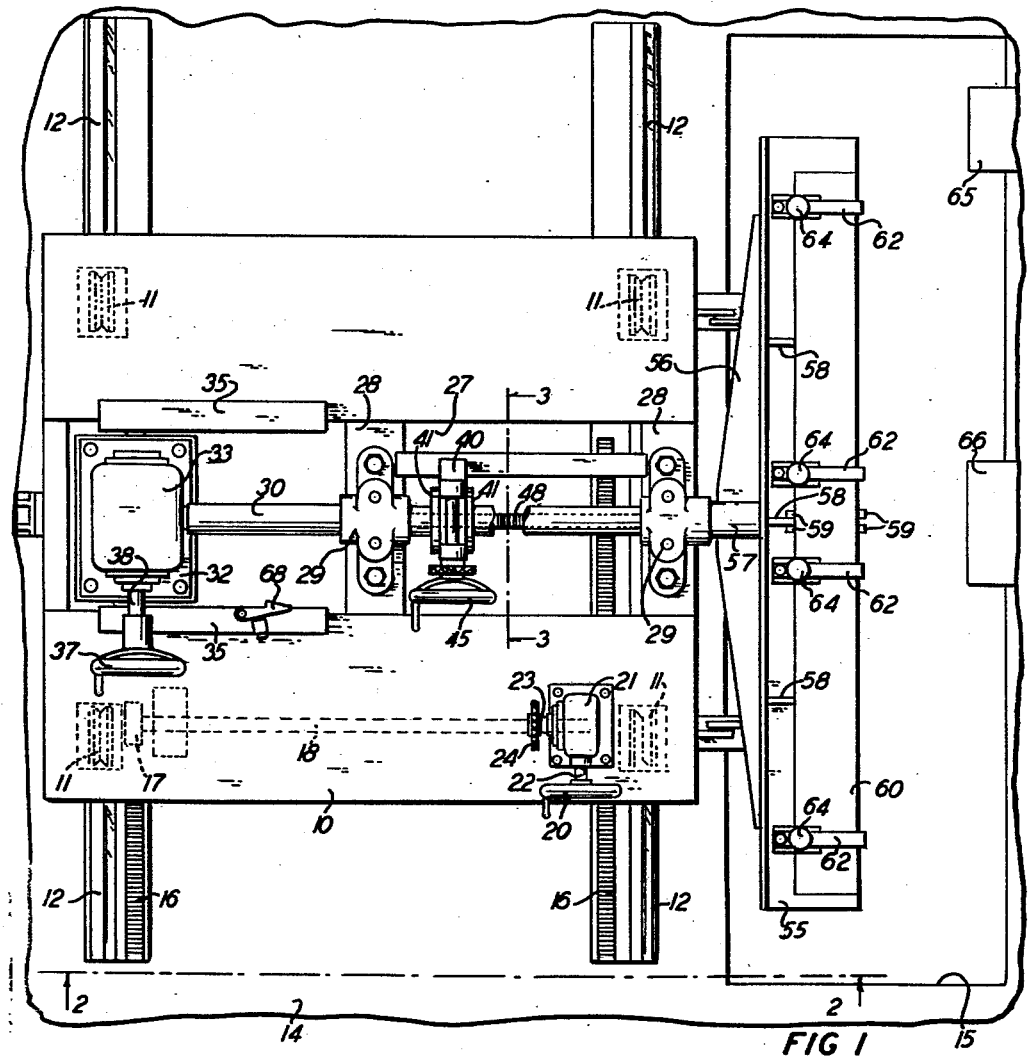
Fig. 1 is a top plan view of the apparatus.
Figure 2:
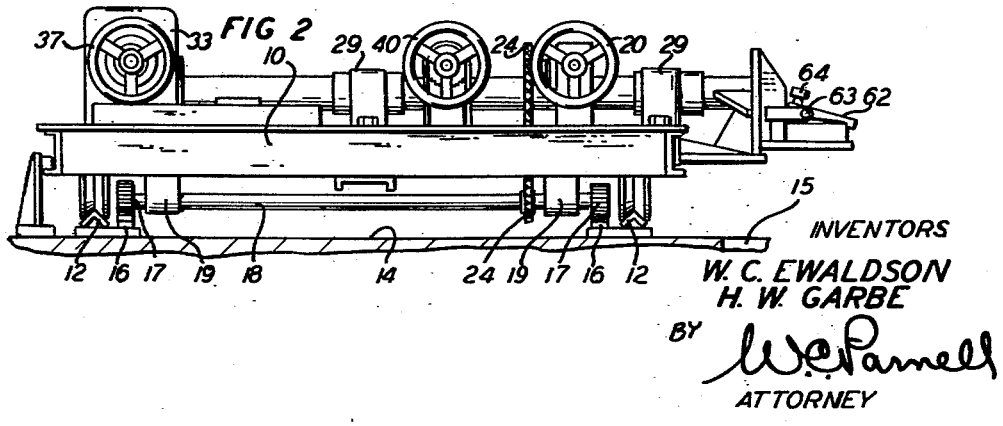
Fig. 2 is a side elevational view of the apparatus taken along the line 2—2 of Fig. 1.

The apparatus includes a carriage 10 having grooved rollers 11 rotatably mounted on the undersurface of the carriage and positioned to ride upon inverted V-shaped tracks 12. The tracks 12 are mounted on a floor 14 parallel with each other and with a pit 15 in the floor. Parallel racks 16 are mounted adjacent the tracks 12 on the floor and interengage pinions 17 which are mounted on the outer ends of a shaft 18. The shaft 18 is journalled in suitable bearings of supporting brackets 19 which are secured to the undersurface of the carriage 10. The additional portion of the driving means for the carriage includes a hand wheel 20 of a unit or gear box 21, the hand wheel being mounted on an input shaft 22 of this unit while the output shaft 23 of the unit is operatively connected to the shaft 18 through sprocket and chain means 24. This completes the driving means for the carriage, making it possible through rotation of the hand wheel 20 in either direction to move the carriage in the given path longitudinally of its tracks in either direction.

An open central portion 27 of the carriage 10 has fixedly mounted therein parallel members 28 supporting bearings 29 for a shaft 30. A movable support 32 for a drive unit 33 is disposed in the open central portion 27 and has laterally extending rollers 34 (Fig. 3) disposed in channellike tracks 35 mounted on the carriage 10 to permit movement of the support 32 and unit 33, to impart axial movement to the shaft 30 in the bearings 29. The purpose of the unit 33 is to impart rocking or rotary motion to the shaft 30, the unit being actuated by a hand wheel 37 mounted on an input shaft 38, while the shaft 30 is connected directly to the output portion of the unit 33.

The means for imparting axial movement to the shaft 30 includes a unit 40 (Figs. 1 and 3) mounted between fixed collars 41 on the shaft 30 with the shaft extending through an aperture in the unit and free to rotate therein. The unit 40 carries parallel shafts 43 and 44 which are free to rotate in their respective bearings, the shaft 43 having a hand wheel 45 mounted thereon and operatively connected through sprockets and a chain 46 to the shaft 44. A pinion 47 mounted on the shaft 44 interengages a rack 48 which is fixedly mounted on suitable portions 49 of the carriage which extends longitudinally of the open central portion 27 and at right angles to the tracks 12. A bearing 50, extending between members 28 and fixed thereto, extends into a notch 51 of the unit 40 to hold the unit in its vertical position against rotation with the shaft 30. With this mechanism embodied in the unit 40, the shaft 30 may be moved axially relative to the carriage 10 and the pit 15.

A shelf 55 with suitable reinforcing fins or ribs 56 is mounted fixedly at 57 on the outer end of the shaft 30. Spaced locating elements 58 are mounted on the shelf 55, the central element being utilized in cooperation with pairs of blocks 59 on each of the articles 60 to assist in supporting the articles, particularly when the shelf is moved with the article into verticle position as shown in Fig. 4. The articles 60 are elongate structures and the shelf 55 is of sufficient width to support the articles singly thereon when in the horizontal position shown in Fig. 1, which may be the normal loading position for the shelf. While in this position, the article may be disposed on the shelf and any desired number of clamps 62 actuated to secure the article to the shelf. The clamps 62 are pivotally supported at 63 and have thumbscrews 64 disposed in threaded apertures in the inner ends of the clamps to engage inner portions of the article and cause the outer ends of the jaws to move into close engagement with the outer edge of the article.

Considering now the operation of the apparatus, let it be assumed that material working units or assembling stations 65 and 66 are located adjacent the pit 15 and at these stations it is desirable to perform certain functions regarding each article held in the apparatus, but to perform these functions it is necessary that the article be moved into various positions relative to the units. To accomplish these results, the apparatus must be actuated so that the article may be placed on the shelf with the innermost pair of blocks 59 straddling the central locating element 58, after which the clamps 62 may be moved into their clamping positions through actuation of the thumbscrews 64. After the article has been mounted on the shelf, the operator may bring about the desired movements of the article through the selective actuation of any or all of the units 21, 33 and 40 by rotating the hand wheels 20, 37 and 45 thereof in either direction and for selected time intervals to bring the article successively into the chosen positions relative to the work areas determined by the units 65 and 66. These movements may be made singly, simultaneously or in any desired order. If it is desirable to move the article into a vertical position as shown in Fig. 4, this may be accomplished by rotating the hand wheel 37 in either direction depending upon which end of the article is to extend into the pit and which end of the article is to extend above the pit. Rotation of the hand wheel 37 actuates the unit 33 to rotate the shaft in its bearings 29 to position the article, as shown in Fig. 4, which is a truly vertical position, or in any angular position which may be desired. Rotation of the hand wheel 45 will cause actuation of the unit 40, driving the pinion 47 on the rack 48 in either direction to move the shaft 30 axially and pull with it the unit 33 a distance limited by a latch or stop 68. An additional set of motions may be imparted to the shelf and article by rotating the hand wheel 20 in either direction to drive the shaft 18 and its pinions 17 relative to the racks 16 to move the carriage and all structures supported thereby, including the shelf and the article, longitudinally of the pit relative to the working units or stations 65 and 66.

When the necessary operations on the article have been completed, the article may be removed from the shelf by loosening the thumbscrews 64 to effectively loosen the clamps 62 if it is desirable to remove the article from the shelf while in a vertical position and it is known previously that this is going to be done, the clamp 62 which will be in the pit at that time, may be left free of the article using only the upper three clamps to hold the article in place, as these three clamps are accessible above the pit to remove the vertical article from the shelf.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for supporting and moving elongate articles having parallel projections fixed to one side thereof, the apparatus comprising parallel tracks, a carriage having supporting wheels disposed on the tracks for movement of the carriage in a given path, a shaft mounted on the carriage transversely of the path for rotation about its axis, an elongate shelf disposed at right angles to the shaft and fixedly mounted adjacent its longitudinal center on one end of the shaft to removably support the elongate articles singly, a locating element fixed to the shelf for interengagement with the parallel projections of the article to interconnect the shelf with the article to assist in supporting the article when the shelf is rocked with the shaft, and means to removably secure the article to the shelf and maintain the interconnection of the projections and locating member.

2. An apparatus for supporting and moving elongate articles singly relative to a pit in a floor comprising parallel tracks mounted on the floor adjacent and parallel with the pit, a carriage having supporting wheels disposed on the tracks for movement of the carriage in a path parallel with the pit, a shaft mounted on the carriage transversely of the path for rotation about its axis, an elongate shelf disposed at right angles to the shaft and fixedly mounted adjacent its longitudial center on the end of the shaft adjacent the pit to removably support the elongate articles singly, clamps disposed at spaced positions longitudinally of the shelf and selectively operable to removably secure the article to the shelf, and means operable to rock the shaft to move either end of the shelf with the respective end of the article clamped thereon into the pit and into any desired radial position about the axis of the shaft.

3. An apparatus for supporting and moving elongate articles singly relative to a pit in a floor comprising parallel tracks mounted on the floor adjacent and parallel with the pit, a carriage having supporting wheels disposed on the tracks for movement of the carriage in a path parallel with the pit, a shaft mounted on the carriage transversely of the path for rotation about its axis, an elongate shelf disposed at right angles to the shaft and fixedly mounted adjacent its longitudinal center on the end of the shaft adjacent the pit to removably support the elongate articles singly, clamps disposed at spaced positions longitudinally of the shelf and selectively operable to removably secure the article to the shelf, means operable to rock the shaft to move either end of the shelf with the respective end of the article clamped thereon into the pit and into any desired radial position about the axis of the shaft, means mounted on the carriage to support the shaft for axial movement relative to the carriage and the pit, and means operable to move the shaft axially to move the shelf with the article clamped thereon into any of numerous selected positions.

4. An apparatus for supporting and moving elongate articles singly relative to a pit in a floor comprising parallel tracks mounted on the floor adjacent and parallel with the pit, a carriage having supporting wheels disposed on the tracks for movement of the carriage in a path parallel with the pit, a shaft mounted on the carriage transversely of the path for rotation about its axis, an elongate shelf disposed at right angles to the shaft and fixedly mounted adjacent its longitudinal center on the end of the shaft adjacent the pit to removably support the elongate articles singly, clamps disposed at spaced positions longitudinally of the shelf and selectively operable to removably secure the article to the shelf, means operable to rock the shaft to move either end of the shelf with the respective end of the article clamped thereon into the pit and into any desired radial position about the axis of the shaft, means mounted on the carriage to support the shaft for axial movement relative to the carriage and the pit, means operable to move the shaft axially to move the shelf with the article clamped thereon into any of numerous selected positions, and driving means actuable to move the carriage on the tracks relative to the pit to vary the position of the shelf with the article clamped thereon in the pit.

References Cited in the file of this patent

UNITED STATES PATENTS

| | | |
|---|---|---|
| 432,593 | Berg | July 22, 1890 |
| 807,118 | Kelly | Dec. 22, 1905 |
| 888,175 | Kendall | May 19, 1908 |
| 2,110,530 | Saives | Mar. 8, 1938 |
| 2,677,475 | Davies et al. | May 4, 1954 |